United States Patent [19]

Shimizu et al.

[11] Patent Number: 4,572,646
[45] Date of Patent: Feb. 25, 1986

[54] DISPLAY DEVICE IN CAMERA FINDER

[75] Inventors: Masami Shimizu, Tokyo; Nobuyuki Suzuki, Kanagawa, both of Japan

[73] Assignee: Canon Kabushiki Kaisha, Tokyo, Japan

[21] Appl. No.: 698,632

[22] Filed: Feb. 6, 1985

[51] Int. Cl.$^4$ .................... G03B 17/20; G09F 9/00
[52] U.S. Cl. .................... 354/475; 354/289.1; 340/793; 340/812
[58] Field of Search ............ 354/471, 474, 475, 289.1, 354/289.12, 219, 224, 225; 340/793, 812

[56] References Cited

U.S. PATENT DOCUMENTS

| | | | |
|---|---|---|---|
| 3,955,892 | 5/1976 | Numata et al. ............... | 354/471 X |
| 4,006,485 | 2/1977 | Yamanishi et al. ............ | 354/471 |
| 4,143,954 | 3/1979 | Numata et al. ............... | 354/471 |
| 4,297,691 | 10/1981 | Kodama et al. ............... | 340/793 X |

Primary Examiner—William B. Perkey
Attorney, Agent, or Firm—Toren, McGeady, Stanger, Goldberg & Kiel

[57] ABSTRACT

A display device in the finder of a camera has a plurality of digits of light-emitting elements for displaying exposure information on the side of a frame of field of view of the finder. The light-emitting element of the nearest one of the digits to the frame of field of view is made brightest, and, as the distance from the frame increases, the brightness of the light-emitting element of each digit is made lower. Therefore, the apparent brightnesses of all the light-emitting elements become almost equal to one another, permitting the observer to read the displayed information with ease and clearness.

7 Claims, 8 Drawing Figures

DISPLAY DEVICE IN CAMERA FINDER

BACKGROUND OF THE INVENTION

1. Field of the Invention

This invention relates to display devices for displaying exposure information of a camera by using a plurality of light-emitting elements, particularly 7-segment LEDs (light-emitting diodes) in the finder of the camera.

2. Description of the Prior Art

Figure 1:
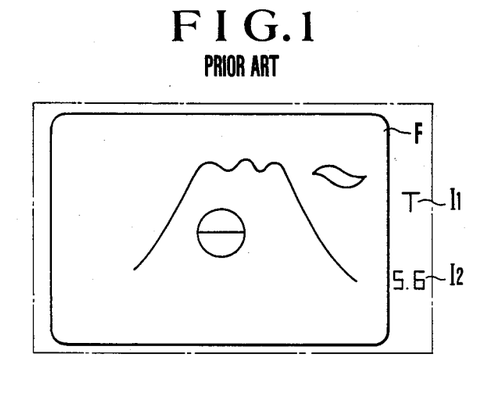
FIG. 1 is a plan view of the field of view of the finder of the camera with the conventional display using 7-segment LEDs.

To display exposure information of a camera within the finder of the camera, it has already been proposed to lay out the display device at such a location as shown in a drawing of the field of view of the finder of FIG. 1. In this figure F denotes the frame of the field of view, I1 an indicia information indicating the exposure mode of the camera, and I2 a photographic information determined by the given photographic conditions, for example, the aperture value of the photographic lens as [5.6] by 2 digits of 7-segment LEDs.

To realize such a display of FIG. 1 in the finder, since there is the limitation on the size of the penta prism, because the photographer looking through the finder can observe only a slightly larger area than the field of view as indicated by a dot-and-dash line block, the display of large lateral width such as the exposure information I2 must be positioned as near the frame F of the field of view as possible. It should be noted that if the exposure information I2 is juxtapositioned with the frame F, it often happens that when the brightness within the frame F is very high, the flare due to the irregular reflection in the finder optical system gives rise to a phenomenon that the LED of the first one of the two digits of the exposure information I2, or that 7-segment LED which lies nearer to the frame F of the field of view appears to be darker than the outer 7-segment LED. To eliminate this problem, a method of supplying large current to the 7-segment LEDs so that the LEDs operate at the maximum brightness may be considered. Because such a large consumption of current is required, however the use of this method results in a certain drawback That is because as the battery in the camera is of small size and small capacitance, the life time of the battery is extremely shortened. This results in increase of expense of the user.

SUMMARY OF THE INVENTION

An object of the present invention is to provide a display device in the finder of a camera which has eliminated the above-described drawback.

Another object of the present invention is to provide a display device of reduced consumption of current.

Other objects of the present invention will become apparent from the following detailed description thereof.

DETAILED DESCRIPTION OF THE PREFERRED EMBODIMENTS

Figure 2:
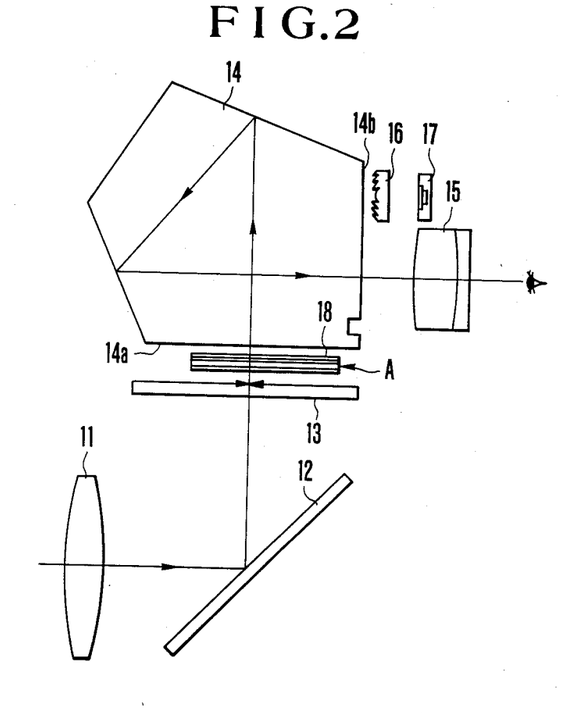
FIG. 2 is a sectional view of an optical system of the single lens reflex camera employing the display of the invention.

Referring first to FIG. 2, the optical system of the single lens reflex camera to which the present invention is applied includes a photographic lens 11, a pivotal mirror 12, a focusing screen 13, a penta roof type prism 14, and an eye-piece 15. Light coming from an object to be photographed and entering through the photographic lens 11 is reflected from the mirror 12 to the focusing screen on which an image of the object is formed. Light from the object image after having reflected from some of the surfaces of the prism 14 passes through the eye-piece lens 15 to an eye of the observer, as is well known in the art. A light collecting Fresnel lens 16 and a photo-sensitive element 17 constitute a light receiving system or a light metering portion, is positioned behind the exit face 14b of the penta roof type prism 14 and above the eye-piece lens 15. A is an information display body of which a display film 18 faces at the bottom face 14a of the penta roof type prism.

Figure 3:
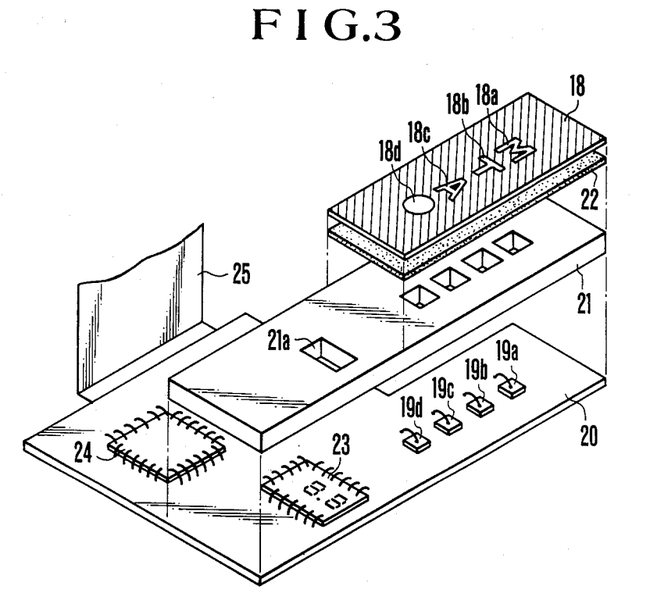
FIG. 3 is a production view, in enlarged scale, of the display device of FIG. 2.

FIG. 3 is an exploded perspective view in an enlarged scale of a practical example of the information display body A shown in FIG. 2 of the display device according to the present invention.

In the drawing, the display film 18 has information display symbols 18a, 18b, 18c and 18d representing the exposure modes and a warning signal depicted thereon. Dot LEDs (light-emitting diodes) 19a, 19b, 19c and 19d are mounted on a substrate 20 by bonding in alignment with the respective information display symbols 18a, 18b, 18c and 18d. A shielding plate 21 has four square openings in which the dot LEDs 19a, 19b, 19c and 19d are respectively fitted so that the light from each of the dot LEDs does not leak to illuminate the adjacent ones of the symbols 18a, 18b, 18c and 18d. A diffusion tape 22 lies between the display film 18 and the shielding plate 21 so that the light from the dot LEDs 19a to 19d uniformly illuminates the corresponding information display symbols 18a to 18d. A 2-digit display member 23 is formed by 7-segment LEDs with one dot and is bonded to the aforesaid substrate 20. The aforesaid shielding plate 21 has an additional opening 21a in alignment with said LED 23 and shields the LED 23 from leaking its light toward the aforesaid display film 18. For this purpose, the display film 18 and the diffusion tape 22 are arranged away from said opening 21a. Also, 24 is an IC for driving the LEDs 19a to 19d and 23 to light on properly, 25 is a flat cable connecting the substrate 20 with other circuits (not shown) of the camera.

The operation of the display device of such construction is as follows: As the exposure modes are selectively operated depending on the given photographic situation, when, for example, the shutter speed priority mode is selected, the LED 19b is lighted on. This light is guided by the corresponding opening of the shielding plate 21 to the diffusion tape 22 by which the corresponding symbol 18b of the display film 18, in this instance, letter "T" is uniformly illuminated. The display information bearing light beam from said display symbol 18b enters the bottom face 14a of the penta roof type prism 14 and goes along a similar optical path of that of the photographic image bearing beam, presenting itself as a display information I1 of [T] at the lateral side of the frame F of view finder as shown in the drawing of the field of view of the finder in FIG. 1.

Also, as the photographic information determined by the photographic conditions, for example, the aperture value of the photographic lens is determined by an electronic circuit to be described later, and a two-digit number [5.6] is displayed by the LED 23 of 7-segments. Light from the LED 23 similarly to the above enters the bottom face 14a of the penta roof type prism 14 and presents itself as another display information I2 of [5.6] below the aforesaid first display information I1 at the same lateral side of the frame F of view finder as shown in FIG. 1.

On the other hand, when the aperture priority mode is set by a selector (not shown) accessible from the outside of the camera, the LED 19c is lighted on. Similarly to the above, the display symbol 18c of the display film 18, in this instance, letter [A], is illuminated. The object brightness is measured by the photo-sensitive element 17 and computed by an electrical circuit to be described later to obtain a shutter time. When it lies between 2 seconds and 1/90 second, the computed value of shutter time is displayed in 0.5-step increments by the 7-segment LED 23. For faster speeds than 1/25 second, when it is 1/125 sec. 1/180 sec. and 1/259 sec. letters [H.L] is displayed. When 1/350 sec., 1/500 sec., 1/750 sec. or 1/1000 sec. letters [H.H] are displayed by the 7-segment LED 23.

Figure 4:
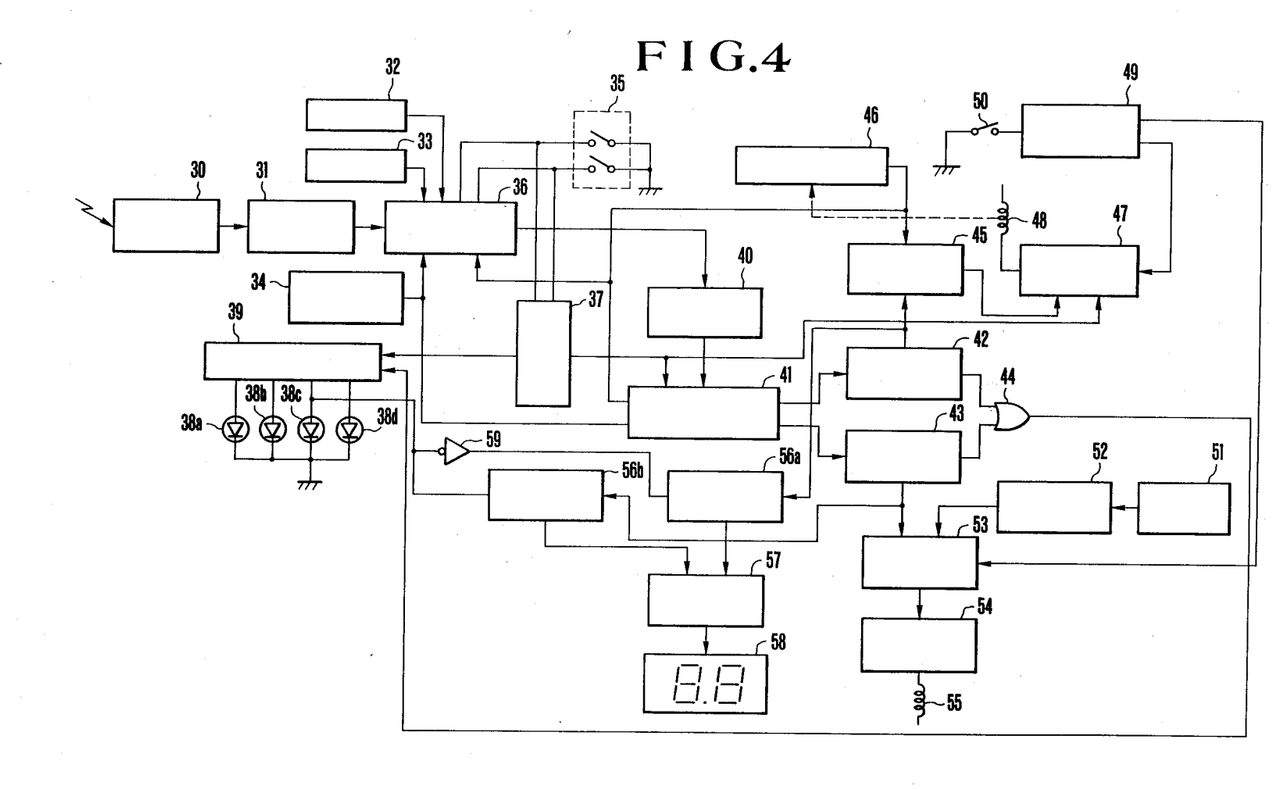
FIG. 4 is a block diagram of an electrical circuit for controlling the operation of the display device of FIG. 2.

An embodiment of an electrical circuit for operating such display device is described by reference to the block diagram of FIG. 4.

In the drawing, 30 is a light metering circuit for converting the object brightness sensed through the lens and prism by an SPC (silicon photo cell) or other suitable photo-sensitive element to an electrical signal; 31 is an A/D converter for converting the light metering output voltage of the light metering circuit 30 to a digital pulse number repeatedly in a prescribed period; 32 is a film sensitivity (ISO) information pulse code plate for producing a corresponding pulse code to the film sensitivity set in by an ISO dial (not shown); 33 is a lens full open F-number information pulse code plate for producing a corresponding pulse code to the F-number at full open aperture of the lens attached to the camera; 34 is a shutter time information pulse code plate for producing a corresponding pulse code to the preset shutter time by a shutter dial (not shown); 35 is an exposure mode setting switch having two switch elements and having switched positions for manual (M), aperture priority (A), and shutter speed priority (T); 36 is an APEX computer circuit in which based on the object brightness information from the A/D converter 31 and the preset informations from the pulse code plates 32, 33 and 34 and an aperture pulse code plate 46 to be described later, an information necessary for the selected exposure mode by the exposure mode selector switch 35 is digitally computed; 37 is a decoder for decoding the 2-bit information of the selector switch 35 to select the corresponding one of four bit output lines to the set exposure mode; 39 is an LED drive circuit for supplying current to dot LEDs 38a, 38b, 38c and 38d for display to light on. The display dot LEDs 38a, 38b, 38c and 38d correspond respectively to the dot LEDs 19a, 19b, 19c and 19d shown in FIG. 3; 40 is a digital memory circuit for memorizing the output of the APEX computer circuit 36 for each period; 41 is a data selector for transferring the information (computed value) from the APEX computer circuit 36 through the digital memory circuit 40 and either the preset shutter time information from the shutter time information pulse code plate 34 or the preset aperture information from the aperture pulse code plate 46 to either an Av register 42, or Tv register 43, depending on the preset exposure mode. For example, when in the shutter speed priority mode, the shutter time information (Tv) from the shutter time information pulse code plate 34 and the computer information of the APEX computer circuit 36 are sent to the Av resistor 42 and the Tv register 43 respectively. The Av register 42 and the Tv register 43 memorize corresponding pulses to the aperture value information and shutter time information from the data selector 41 respectively, and each produce an overflow output when the aperture value or the shutter time falls outside the range of control as the object brightness is dark. When either one of the Av register 42 and Tv register 43 produces the overflow output, an OR gate 44 produces an output of high level which is applied to the LED drive circuit 39; 45 is a coincidence circuit for sending a signal to an aperture control circuit 47 when the digital values of the Av register 42 and the aperture pulse code plate 46 coincide with each other.

The aperture pulse code plate 46 produces a corresponding pulse to the aperture value of the lens and controls an aperture control magnet 48 based on the signal from the coincidence circuit 45 when the content of the Av register 42 and the actual aperture value of the lens, or the content of the aperture pulse code plate 46 coincide with each other. Also when the manual mode is selected by the exposure mode setting switch 35, the aperture control circuit 47 is rendered inoperative by the signal of the decoder 37, permitting the aperture to be adjusted manually.

49 is a release sequence circuit responsive to turning on of a release switch 50 for commanding the aperture pulse code plate to slidingly move and an operation of aperture control circuit 47. In addition thereto, the other various portions of the camera are controlled in sequence. The release switch 50 is responsive to the second stroke of depression of a release button (not shown). The aforesaid aperture control magnet 48 is controlled by the aperture control circuit 47 as has been mentioned above, and stops sliding movement of the aperture pulse code plate 46 so that the aperture value of the lens is brought into coincidence with the computed value. 51 is a clock pulse oscillator for producing standard pulses; 52 is a frequency divider for dividing the frequency of the clock pulses from the clock pulse oscillator 51 to a prescribed value of frequency; 53 is a shutter time expanding circuit for expanding the digital value of the Tv register 43 to a shutter time based on the output of the frequency divider 52; 54 is a shutter control circuit for controlling a shutter drive magnet 55 in accordance with the output of the shutter time expanding circuit. The shutter drive magnet 55 controls a shutter (not shown). 56a and 56b are decoders for converting respectively the digital values (binary number) of the Av register 42 and the Tv register 43 to 7-segment display codes for the 7-segment LED 58. Its operation is controlled by the anode voltage of the LED 38c so that when its anode voltage is high, the decoder 56b operates, and when it is low level, the decoder 56a operates. 57 is an LED drive circuit for supplying current to the 7-segment LED 58 based on the output of the decoders 56a and 56b so that it lights on. The 7-segment LED 58 corresponds to the 7-segment LED 23 of FIG. 3, displaying the aperture value, shutter time and abbreviated forms of shutter time values; 59 is an inverter of which the output controls the operation of the decoder 56a.

The operation of the electrical circuit of such construction is as follows: When a shutter button (not shown) is depressed to a first stroke, each of the prescribed portions is supplied with electrical current from an electrical power source or battery. A voltage proportional to the object brightness from the light metering circuit 30 is converted to a number of pulses by the A/D converter 31. Such A/D converting operation is recycled in a prescribed period. That is, as the APEX value, a corresponding number of pulses to Bv−AvO is produced. By the APEX computer circuit 36 this pulse number is computed with the signals Sv and AvO from the film sensitivity information pulse code plate 32 and the lens full open F-number information pulse code plate 33 respectively based on the formula: (Vb−AvO)+Sv+AvO to obtain an exposure value Ev. This Ev is further computed with either the signal Tv of the shutter time information pulse code plate 34 or the signal Av of the aperture pulse code plate 36 depending on the exposure mode. For example, when in the shutter speed priority mode, this Ev is computed with the signal Tv of the shutter time information pulse code plate 34 based on the formula (Ev−Tv=Av) to produce a corresponding number of pulses to the Av at the output of the APEX computer circuit 36.

The selection of the computation formula for the preset exposure mode is determined by the exposure mode setting switch 35. The pulses produced from the APEX computer circuit 36 in accordance with the photographic conditions and exposure mode are temporarily stored on the digital memory circuit 40 and then given to the data selecter 41. For example, when in the shutter speed priority mode, a corresponding number of pulses to the signal Tv from the shutter time information pulse code plate 34 is applied through the data selector 41 to the Tv register, while a corresponding number of pulses to the computed Av from the object brightness, film sensitivity and the preset value of shutter time is successively transferred from the APEX computer circuit 36 through the digital memory circuit 40 and the data selector 41 to the Av register 42. Here when the value of the registers 42 and 43 falls beyong the control range of shutter time, aperture value, either or both of the registers 42 and 43 produces or produce an overflow output, changing the output of the OR gate 44 to high level.

By the way, as for the display with the dot LEDs 38a, 38b, 38c and 38d, the LED drive circuit 39 operates in such a manner that depending on the preset exposure mode by the exposure mode setting switch 35, one of the output lines of the decoder 37 is selected to produce an output so that by this signal the corresponding one of the dot LEDs 38a to 38c is lighted on. For example, when the shutter speed priority mode is selected, the LED 38b is lighted on, and when the aperture priority exposure mode is selected, the LED 38c is lighted on. Also when the shutter time or the aperture value lies outside the control range, as has been described above, the signal of high level from the OR gate 44 is applied to the LED drive circuit 39. Therefore, in addition to one of the LEDs 38a to 38c, the LED 38d too is lighted on as a warning signal.

Next explanation is given to the aperture control. When the aforesaid release button is further despressed to a second stroke, the release switch 50 is turned on, and the release sequence circuit 49 commands an operation of the aperture control circuit 47. By this command, the aperture control magnet 48 is supplied with current, and at the same time the aperture of the lens moves from the full open side to the minimum size, for example. Along with this, the aperture pulse code plate 46 changes its pulse number. Since the aperture pulse code plate 46 corresponds to the size of aperture opening of the lens, when its pulse number coincides with the pulse number of the Av register 42, the coincidence circuit 45 produces a de-actuating signal which is applied to the aperture control circuit 47 so that the magnet 48 is de-energized. Thus, the size of aperture opening of the lens is automatically adjusted to the preset or computed value.

As for the control of the shutter time, the pulse number of the Tv register 43 is expanded by the shutter time expanding circuit 53 based on the output of the frequency divider 52 which is obtained by dividing the frequency of the standard clock pulses from the clock pulse oscillator 51. By this expanded signal, the shutter drive magnet 55 is driven through the shutter control circuit 54, and the shutter (not shown) is controlled.

Also as for the display of the 7-segment LED 58, at first, when, by setting the exposure mode setting switch 35, the shutter speed priority or the manual exposure mode is selected, the dot LED 38c is not supplied with current. Therefore the output of the inverter 59 takes high level, thereby the decoder 56a which is connected to the output of the inverter 59 is rendered operative to convert the binary code of the Av register 42 to a 7-segment display code for the 7-segment LED 58. Thus, its value or the computed aperture value is displayed by the 7-segment LED 58 through the LED drive circuit 57. But at this time the decoder 56b does not operate.

Next when the aperture priority mode is selected by the exposure mode setting switch 35, the dot LED 38c is lighted on and its anode terminal becomes high level, thereby the decoder 56b is rendered operative. On the other hand, the output of the inverter 59 becomes low level, rendering the decoder 56a inoperative. As the decoder 56b operates, the binary coded content of the Tv register 43 is converted to a 7-segment display code for the 7-segment LED 58, and the converted value is displayed by the 7-segment LED 58 through the LED drive circuit 57.

As to its display content, if the Tv register 43 has a corresponding pulse number to any of the values from 2 to 1/90 sec., its value is displayed in 0.5-step increments by the 7-segment LED 58. If the pulse number corresponds to any of 1/125 sec., 1/180 sec., and 1/250 sec. an abbreviated form of these shutter times, namely, [H.L], is displayed by the 7-segment LED 58. If the pulse number corresponds to any of 1/350 sec., 1/500 sec., 1/750 sec. and 1/1000 sec., another abbreviated form of these shutter times, namely, [H.H] is displayed by the 7-segment LED 58.

Figure 5:
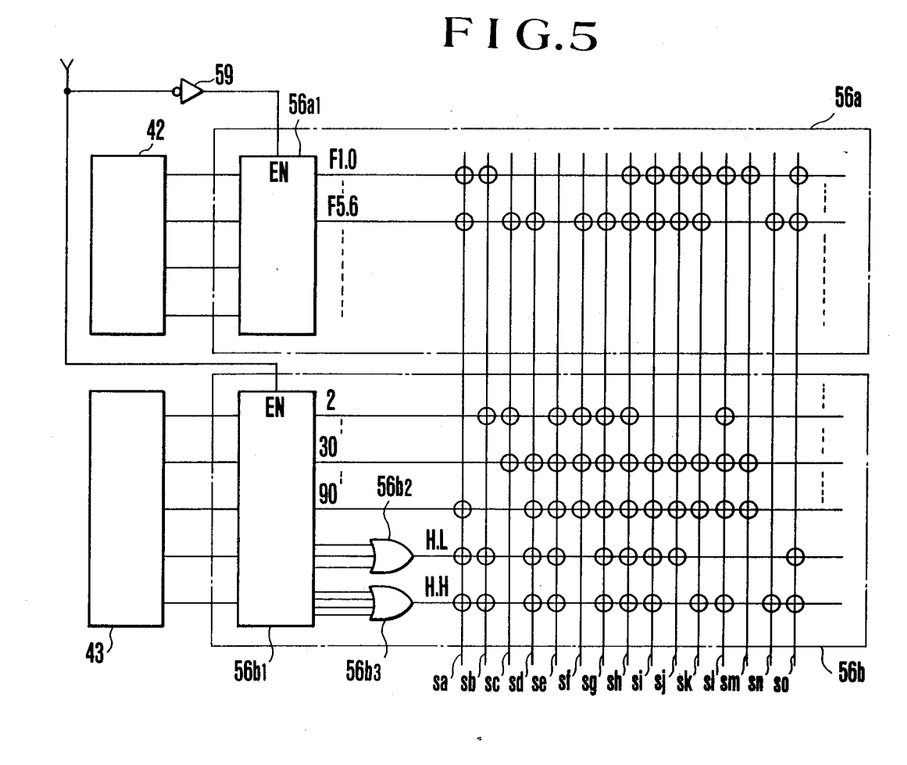
FIG. 5 is an electrical circuit diagram of the 7-segment LED display.

FIG. 5 illustrates an electrical circuit for selectively driving the various segments of the LED 58, where the Av register 42 is constructed in 4-bit form, and the Tv register 43 is constructed in 5-bit form. The decoder 56a is constructed with a 4-bit decoder 56a1 which is rendered operative only when its EN terminal is high level, and a dispaly matrix decoder. The decoder 56b is constructed with a 5-bit decoder 56b1 which is rendered operative only when its EN terminal is high level, and a display matrix decoder. In these matrix decoders, circular marks represent that the longitudinal and lateral lines are electrically conducting at their cross point. Their output lines Sa, Sb, Sc, Sd, Se, Sf, Sg, Sh, Si, Sj, Sk, Sl, Sm, Sn and So are connected through the LED drive circuit 57 to the segments a, b, c, d, e, f, g, h, i, j, k, l, m, n and o of the 7-segment LED 58 respectively. An OR gate 56b2 receives three outputs 1/125 sec., 1.180 sec., and 1/250 sec. out of the outputs of the 5-bit decoder 56b1. Another OR gate 56b3 receives four outputs of 1/350 sec., 1/500 sec., 1/700 sec., and 1/1000 sec.

When in the shutter speed priority or manual exposure mode, as has been described above, the input of the inverter 59 becomes low level, and, therefore, the EN terminal of the 5-bit decoder 56b1 becomes low level, thereby the said decoder 56b1 is rendered inoperative. On the other hand, because the output of the inverter 59 becomes high level, and, therefore, because the EN terminal of the 4-bit decoder 56a1 becomes high level, said decoder 56a1 is rendered operative. From the 4-bit binary code of the Av register 42, the one of the output lines which corresponds to the exposure value is decoded to become high level. For example, when the AV register 42 produces a corresponding code to F/5.6, the 4-bit decoder 56a1 changes only the output line of F/5.6 to high level. Responsive to this, the display matrix decoder energizes the segments, a, c, d, f, g, h, i, j, k, n and o of the 7-segment LED 58.

When in the aperture priority mode, the input of the inverter 59 becomes high level, thereby the 4-bit decoder 56a1 is rendered inoperative, and the 5-bit decoder 56b1 is rendered operative. From the 5-bit binary code of the Tv register 43, a corresponding output line to the shutter time is changed to high level. For example, when the Tv register 43 produces a code of 1/30 sec., the 5-bit decoder 56b1 changes only the output line of 1/30 sec. to high level. Responsive to this, the display matrix decoder energizes the segments c, d, e, f, g, h, i, j, k, l and m of the 7-segment LED 58. Also when the Tv register 45 produces another code corresponding to any of 1/125 sec., 1/180 sec. and 1/250 sec., the OR gate 56b2 produces an output of high level. Responsive to this, the display matrix decoder energizes the segments a, b, d, e, g, h, i, j and o of the 7-segment LED 58. Thus, [H.L] is displayed. Alternatively when the Tv register 43 produces another code corresponding to any of 1/1350 sec., 1/500 sec., 1/750 sec., and 1/1000 sec., the OR gate 56b3 produces an output of high level. Responsive to this the display matrix decoder energizes the segments, a, b, d, e, g, h, i, k, l, n and o of the 7-segment LED 58. Thus, [H.H] is displayed.

In energizing the selected ones of the segments of the 7-segment LED 58, these segments a—o are driven not at a time but sequentially. As the signal lines Sa to So are dynamically scanned, when one of the segments of the 7-segment LED 58 is lighted on, the other segments are all lighted off, in order to insure that the brightness of the LED 58 does not vary with variation of the number of segments energized.

Figure 6:
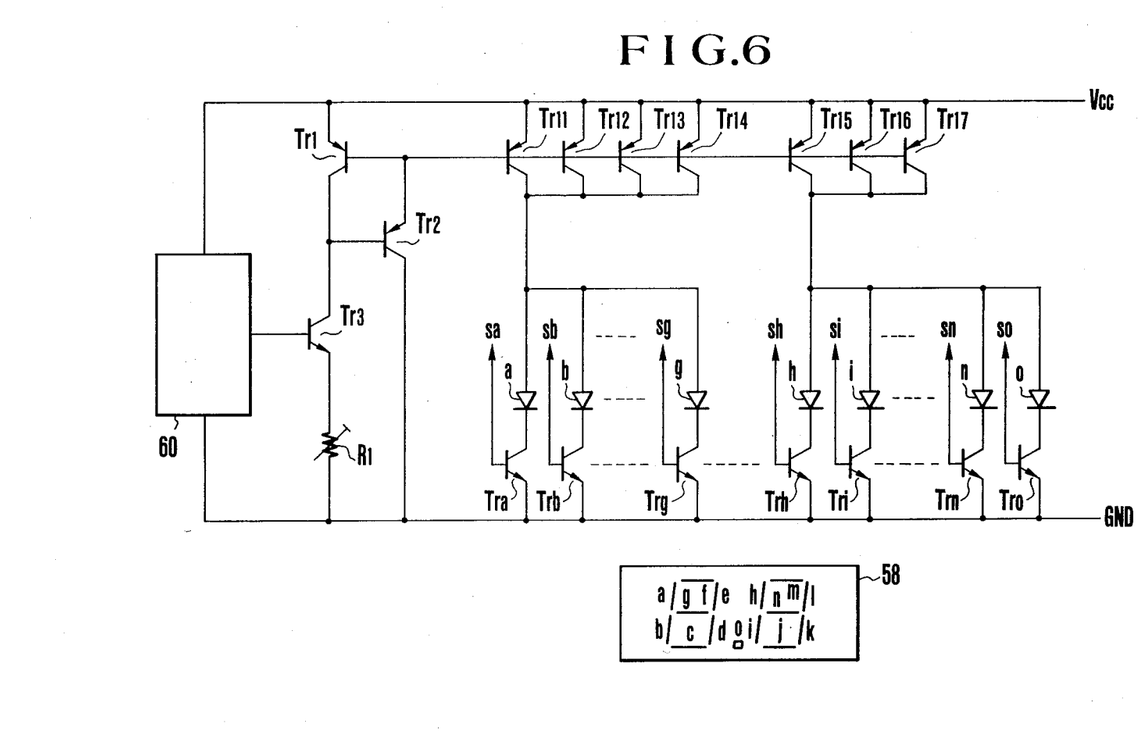
FIG. 6 is an electrical circuit diagram of a practical example of the dot LED drive circuit of FIG. 4.

FIG. 6 illustrates a current control circuit in the LED drive circuit 57, where the output lines Sa to So of FIG. 5 are connected to the respective bases of transistors Tra to Tro.

60 is a constant voltage circuit constituting a constant current circuit together with transistors Tr1 to Tr3 and a semi-fixed resistor R1.

By transistors Tr11 to Tr14, the current supply to the segments "a" to "g" of the 7-segment LED 58 is controlled. By transistors Tr15 to Tr17, the current to the segments "h" to "o" is controlled.

The amount of current supplied to each of the segments "a" to "g" is related to the amount of current supplied to each of the segments "h" to "o" by a ratio of 4:3, because the transistors Tr11 to Tr17 are connected to the transistors Tra to Tro in such a fashion as illustrated in FIG. 6.

Thereby, the segments "a" to "g" of the 7-segment LED 58 which constitutes the nearest digit to the frame F of view finder (see FIG. 1) are set to a higher brightness than the segments "h" to "o".

For this reason, when the Av register 42 produces a code corresponding to, for example, F/5.6 as has been mentioned above, as the segments a, c, d, f, g, h, i, j, k, n and o of the 7-segment LED 58 are energized, the nearest digit to the frame F of view finder, that is, "5" takes a higher brightness than the other digit or "6".

Therefore, even when the field of view of the finder is very bright, both of the two digits forming a single photographic information seems to be the same in brightness by the photographer looking through finder. Thus, a clear-cut impression of the display in the finder is given to the photographer. Another advantage is that the uniformity of brightness over the two digits forming the photographic information allows the level of brightness to be lowered with decrease in the intensity of current flowing to the light-emitting elements of the 7-segment LED display. Therefore, the life time of the battery can be remarkably prolonged.

Figure 8:
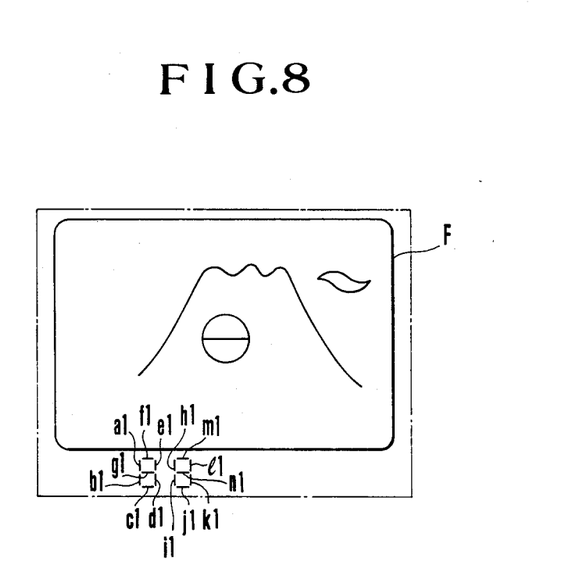
FIG. 8 is a schematic illustration of a third embodiment of the present invention.

It is noted that, when the exposure information I2 is displayed below the frame F of view field as shown in FIG. 8, segments which are near the frame F, for example, segments a1, f1, g1, e1, h1, m1, n1 and l1, may be arranged to have a higher brightness than the other segments, so that the above objects of the present invention can be attained.

Though the foregoing embodiment has been described in connection with the two digits number of photographic information, the present invention is applicable to another type of display where the number of digits is increased to four or more.

Figure 7:
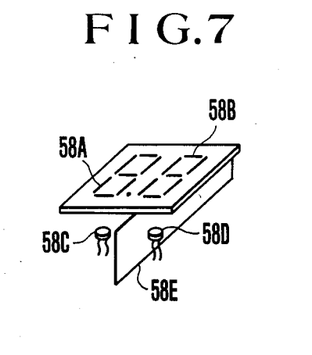
FIG. 7 is a perspective view of the outline of a second embodiment of the present invention.

Also, though the above-described embodiment is an example of application to the display device using the 7-segment LED, when the display device takes another form of a liquid crystal display comprising two elements 58A and 58B (see FIG. 7). light-emitting elements 58C and 58D, for example, light-emitting diodes (LEDs) for the liquid crystal display elements 58A and 58B respectively at the respective places of the liquid crystal display device are energized so that the LED of the one of the digits which is nearest to the frame F of view finder, or the LED 58C, is made brightest, and, as farther away from the frame of view finder, the brightness of the LED 58D is made progressively lower. This also makes it possible to achieve the abovedescribed object of the invention. For note, 58E (FIG. 7) is a light shielding plate for inhibiting light of the LED 58C from reaching the display element 58B, and also light of the LED 58D from reaching the display element 58A.

What is claimed is:

1. An indicating apparatus for a camera comprising:
   (a) a view finder;
   (b) information indicating means provided to be displayed in an end portion of said view finder, said indicating means including at least a first indicating member provided to be displayed adjacent said end portion, and a second indicating member provided to be displayed in a farther position than the position where the first indicating member is displayed; and
   (c) brightness control means for making the brightness of said first indicating member higher than the brightness of said second indicating member.

2. An indicating apparatus according to claim 1, wherein said information indicating means includes a light emitting member.

3. An indicating apparatus according to claim 1, wherein said first indicating member includes a plurality of light emitting element arranged to represent prescribed informations.

4. An indicating apparatus according to claim 1, wherein said second indicating member includes a plurality of light emitting elements arranged to represent prescribed informations.

5. An indicating apparatus according to claim 1, wherein said first indicating member includes a plurality of liquid crystal segments arranged to represent prescribed informations and a light emitting element arranged to illuminate said liquid crystal segments.

6. An indicating apparatus according to claim 1, wherein said second indicating member includes a plurality of liquid crystal segments arranged to represent prescribed informations and a light emitting element arranged to illuminate said liquid crystal segments.

7. An indicating apparatus for a camera comprising:
   (a) a view finder;
   (b) photographic information indicating means provided to be displayed in an end portion of the view finder, the indicating means including at least a first indicating member provided to be displayed adjacent said end portion, and a second indicating member provided to be displayed in a farther position than the position where said first indicating member is displayed; and
   (c) brightness control means for making the brightness of said first indicating member higher than the brightness of said second indicating member.

* * * * *